(12) United States Patent
Overall et al.

(10) Patent No.: US 10,988,267 B2
(45) Date of Patent: Apr. 27, 2021

(54) DRONE CAMERA HANDLES

(71) Applicants: Jeffrey Paul Overall, Fountain Valley, CA (US); John Patrick Kiernan-Lewis, Costa Mesa, CA (US)

(72) Inventors: Jeffrey Paul Overall, Fountain Valley, CA (US); John Patrick Kiernan-Lewis, Costa Mesa, CA (US)

(73) Assignee: Polar Pro Filters, Inc., Costa Mesa, CA (US)

( * ) Notice: Subject to any disclaimer, the term of this patent is extended or adjusted under 35 U.S.C. 154(b) by 596 days.

(21) Appl. No.: 15/883,478

(22) Filed: Jan. 30, 2018

(65) Prior Publication Data

US 2019/0233133 A1 Aug. 1, 2019

(51) Int. Cl.
*B64D 47/08* (2006.01)
*B64C 39/02* (2006.01)

(52) U.S. Cl.
CPC ............ *B64D 47/08* (2013.01); *B64C 39/024* (2013.01); *B64C 2201/123* (2013.01)

(58) Field of Classification Search
CPC . B64D 47/08; B64C 39/024; B64C 2201/123; B64C 2201/127
See application file for complete search history.

(56) References Cited

U.S. PATENT DOCUMENTS

| | | | | |
|---|---|---|---|---|
| 4,984,090 | A | | 1/1991 | Sasaki |
| 5,121,147 | A | | 6/1992 | Wada |
| 5,742,859 | A | * | 4/1998 | Acker ............... F16M 13/04 348/E5.025 |
| 6,773,110 | B1 | * | 8/2004 | Gale ............... F16M 13/04 348/211.4 |
| 7,909,301 | B2 | * | 3/2011 | Faifer ............... F41A 23/08 248/440.1 |
| 8,373,762 | B2 | | 2/2013 | Cottagnoud |
| 8,687,113 | B2 | | 4/2014 | Yano |
| 10,331,232 | B2 | * | 6/2019 | Parazynski ........... G06F 3/0346 |
| 2018/0149947 | A1 | * | 5/2018 | Kim ............... B64C 39/024 |
| 2019/0042003 | A1 | * | 2/2019 | Parazynski ......... G05D 1/0022 |
| 2019/0042004 | A1 | * | 2/2019 | Parazynski ............ G06F 3/039 |
| 2019/0082148 | A1 | * | 3/2019 | Overall ............... G03B 17/563 |

OTHER PUBLICATIONS

Machine translation of Abstract & figure of reference Bie et al. (Pub No. CN 206797763 U) Pub date Dec. 26, 2017 (Year: 2017).*

* cited by examiner

*Primary Examiner* — Rodney A Bonnette

(57) ABSTRACT

Devices and methods improving the ability to manually photograph or record video footage with a camera drone. Handles couple the drone and enhance the ability to balance and manually orient the drone camera. A mounting mechanism permits attachment and hands-free viewing of image data transmitted from the drone camera. Improved ergonomics allow better control of image content and decrease the risk of damage due to dropping or direct handling of the drone.

8 Claims, 5 Drawing Sheets

DRONE CAMERA HANDLES

FIELD OF INVENTION

The present invention relates to manual operation of a camera. Particularly, it relates to handheld filming with drones having integrated or removably coupled camera systems.

List of Prior Art

| U.S. Patents | | | |
|---|---|---|---|
| Pat. No.: | Kind Code: | Grant Date: | Patentee: |
| 4,984,090 | A | 1991 Jan. 8 | Sasaki |
| 5,121,147 | A | 1992 Jun. 9 | Wada |
| 5,742,859 | A | 1998 Apr. 21 | Acker |
| 6,773,110 | B1 | 2004 Aug. 10 | Gale |
| 7,909,301 | B2 | 2011 Mar. 22 | Faifer |
| 8,373,762 | B2 | 2013 Feb. 12 | Cottagnoud |
| 8,687,113 | B2 | 2014 Apr. 1 | Yano |

Background/Prior Art

Unmanned vehicles, namely drones, are now prevalent in photography and cinematography. Cutting edge cameras are now integrated into drones. Drone also permit removable attachment of cameras. Advanced gimbal systems make drones ideal for in-motion image capture. The gimbals stabilize the camera and allow balanced movement, while compensating for inertial disruptions. Drones are capable of real-time transmission of captured image data to electronic display devices. This permits quick adjustment of the camera and accurate image capture. Drones also provide a broad base structurally, providing some natural stability for both one-handed and two-handed manual shooting. Use of drones for both aerial and manual shooting is efficient, as it prevents the need to transport multiple cameras and allows quick transition from manual to remote aerial image capture.

There are some obstacles to handheld filming with a drone. The configuration of drones often prevents an adequate range of motion in filming. Gripping can be difficult because drones are designed to be aerodynamic, with minimal appendages. Damage may result from direct handling of the body, wings, or other appendages of a drone. Additionally, viewing the captured footage can be difficult. The user may shoot blind, without viewing the captured footage, but this prevents adjustment and control based on recording footage. A user may hold a display device in one hand, compromising the ability to control the drone.

The present invention provides a means of attaching handles to drone wings and improving the ability to manually film with a drone camera. The term drone wings is used herein to denote the drone booms or other components that may house the rotors and/or propellers, or other drone appendages. The handles allow range of motion when handheld filming with the drone. Risk of damage to the drone is reduced by prevention of direct contact with the drone body. The handles attach directly to the drone wings to provide a wide, stable image capture base. The handles provide greater stability and allow greater control during quick angular deviations of the drone camera.

Simple installation allows the drone to be mounted quickly and streamlines the transition between aerial and manual filming. A display device may be removably attached to or integrated with the handles, permitting hands free real-time viewing of captured image data. The handles can be folded or disassembled for easy storage.

SUMMARY OF INVENTION

The invention allows attachment of one or more handles to the wings or other extension of a drone with an integrated or mounted camera. A display mount permits attachment of a display screen, remote control, or other device to the handles. The handle(s) may extend to the side, above, below, or behind the camera to prevent obstruction with the optical path of the camera. The display mount may be located above the drone and in the middle of the handles, to permit easy viewing and optimal weight distribution.

The invention couples in at least one location to the wing or other external component of the drone. Coupling can be achieved by pressure-fit hooking, as discussed in the exemplary embodiment, or other means, such as complete clamping to surround a drone wing, adhesion, magnetism or other means. The surface contacting the drone may be lined with polyurethane or other force dampening material to enhance coupling ability and reduce scratching or other damage to the drone.

The stabilizing handle(s) may be one contiguous device or include detachable parts to allow better storage. The display mount may also be permanently or removably attached. The display mount may be operatively coupled to permit orientation in the most advantageous viewing angle.

The invention can be used for a variety of drone sizes but is particularly advantageous when used with larger drones with extended wings. Durable, lightweight material such as carbon fiber or caste aluminum may be used for the handles and coupling components.

The handle(s) may extend to the side or above the drone for optimal ergonomics and control. The exemplary embodiment handles extend laterally from the optical axis of the camera and are angled slightly downward, allowing a natural pronated grip. Alternative embodiments may be configured to neutral or supinated hand grips. The handle configuration will in-part be dependent on drone body and wing design.

Alternative embodiments may allow adjustment of handle length and angle, to permit multiple coupling configurations. The coupling components may also be adjustable to permit coupling with surfaces of different dimensions.

The size of the display mount may be adjustable, permitting secure coupling of devices varying in size. The display mount angle of orientation relative to the handles may also be adjustable to allow optimal viewing and control of a mounted device.

Ribbed, adhesive, or other material augmenting gripping ability may be added to the handles. The drone handles may be capable of folding while assembled to facilitate easier storage and transportation.

Alternative embodiments may include additional handles. This may improve operative capability and help reduce stress by distributing pressure among a greater number of coupling points. A four handled embodiment, for example, may utilize eight coupling components. Additional handles and coupling points may also be beneficial for drones configurations with more than four propellers.

Alternative embodiments may include an integrated electronic display. The integrated electronic display may be communicatively coupled with the drone camera and capable of real-time display of captured image data. The electronic display interface may also provide means of inputting command data to control the drone camera and gimbal system.

Operation with one or both hands is possible. Weight and size of larger drones may require the use of both hands for quick maneuvering. A user may manipulate a coupled or integrated electronic display with one hand while the other holds and stabilizes the drone stabilizing handles.

DRAWING NUMERAL NAMES

10 Drone Stabilizing Handles
22 Handles
24 Coupling hook
26 Extension arm
28 Handle joint
30 Locking sleeve
32 Slot lock
34 Display mount lock
40 Display mount
42 Display stop
44 Display cradle
50 Drone
51 Drone Body
52 Drone Camera
56 Drone Wing

DETAILED DESCRIPTION OF DRAWINGS

Figure 1:
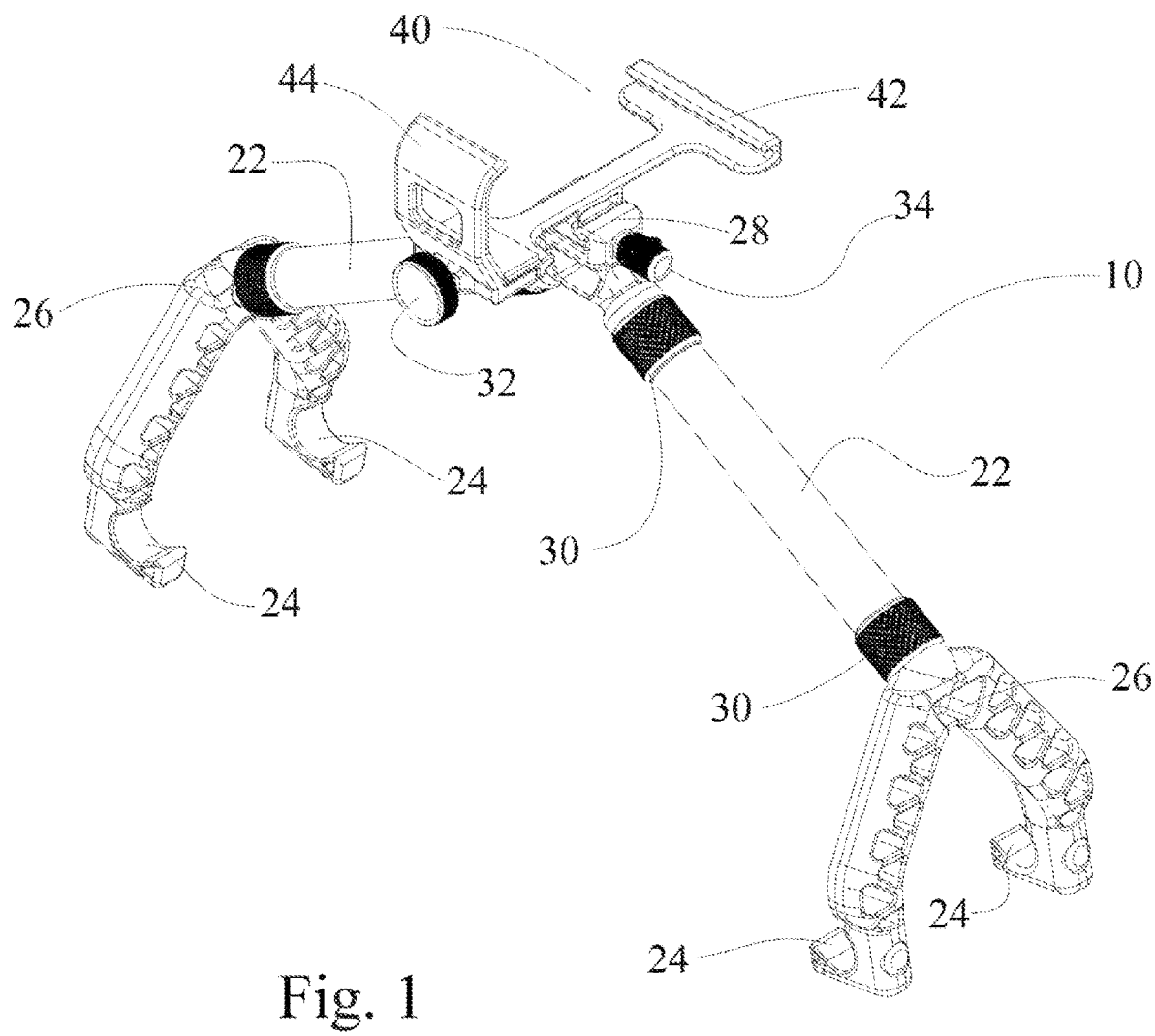
FIG. 1 is a top perspective view of the drone stabilizing handles.

FIG. 1 is a perspective view of the drone stabilizing handles 10 in isolation. Two handles 22 extend laterally outward from the handle joint 28. A locking sleeve 30 is located at both ends of the handles 22. The locking sleeves 30 are cylindrical and are configured to fit around the handles 22, allowing adjustment and detachment of the handles 22. Extension arms 26 extend downward from the handles 22. In this exemplary embodiment the extension arms 26 are threadably coupled with the handles 22. The extension arms 26 fork outward into two prongs. There are coupling hooks 24 at the bottom of each forked segment.

A display mount 40 is situated above the handle joint 28. The display mount 40 may be configured to couple a remote controller, display screen, or any other electrical device or combination of devices. The exemplary remote mount is comprised of a display cradle 44 and display stop 42.

Figure 2:
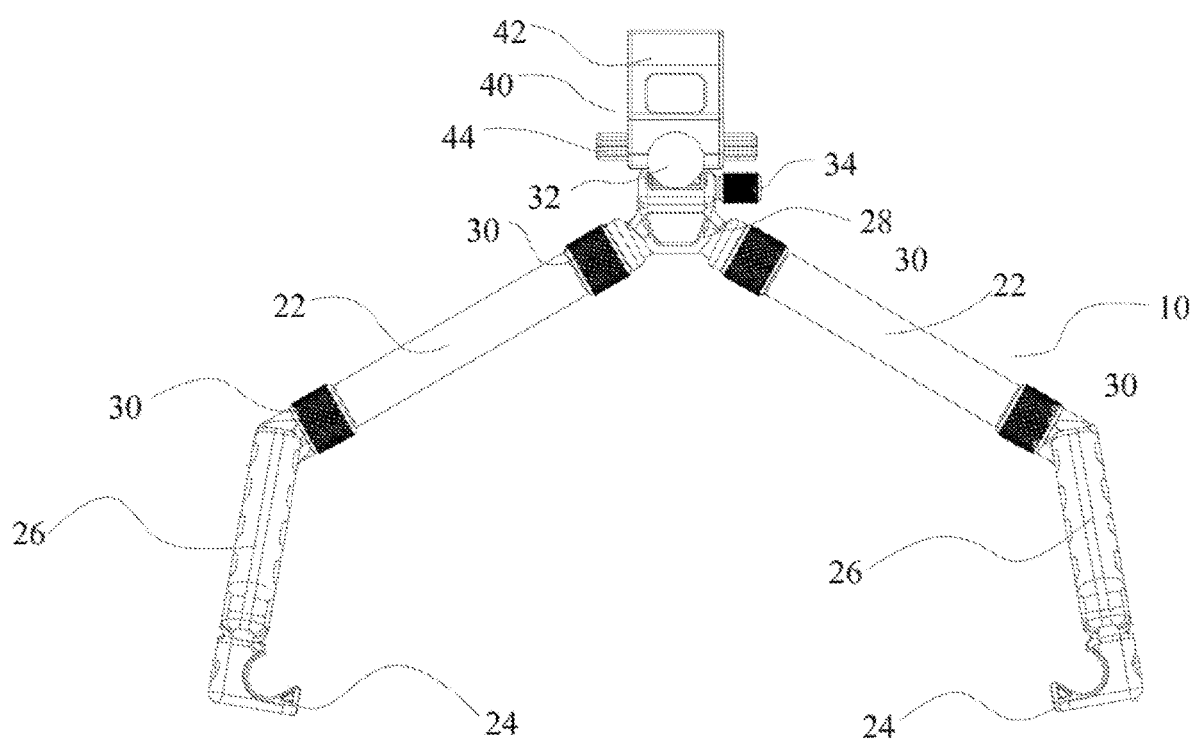
FIG. 2 is a front view of the drone stabilizing handles.

FIG. 2 shows a front view of the exemplary drone stabilizing handles 10. The display mount 40 is located in the center for optimal balance and viewing ability. The exemplary display mount 40 is detachable. The handle joint 28 is configured to receive the bottom of the display mount 40. A display mount lock 34 is inserted into the handle joint 28 and display mount 40, locking the display mount 40 in place. The exemplary grip arms 22 are comprised of carbon fiber, for lightweight strength. The adjustment links 30 are knurled to permit easier adjustment. The extension arms 26 are comprised of metal. The inside of the coupling hook 24 is lined with rubber or polyurethane material to enhance gripping ability and prevent scratching of the coupled drone.

Figure 3:
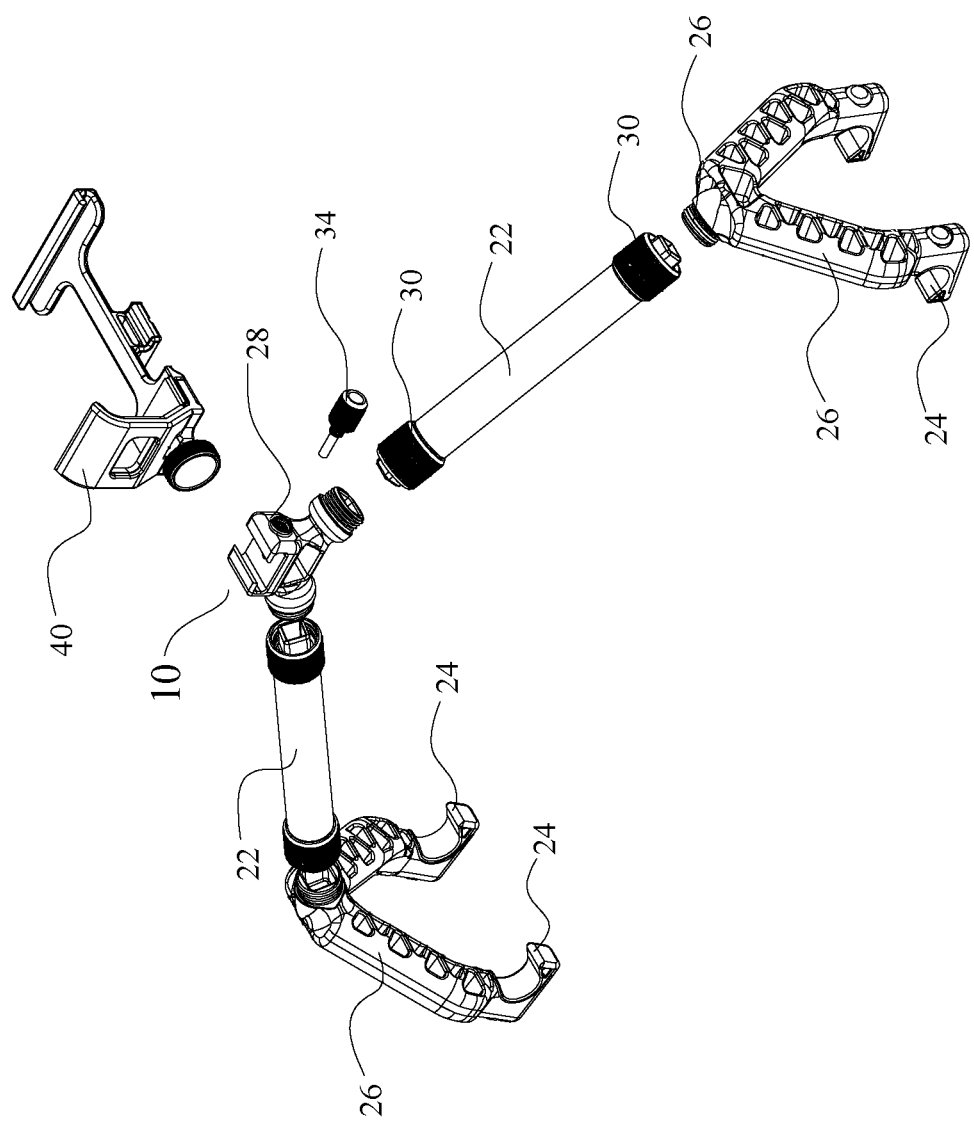
FIG. 3 is an exploded perspective view of the drone handles

FIG. 3 displays the components of the exemplary embodiment of the drone handles 10 exploded. The locking sleeves 30 are loosened to detach the handles 22 from the handle joint 28 and extension arm 26. There is threading on the extension arms 26, handles 22 and handle joint 28 corresponding to the threading inside the locking sleeves 30. The display mount 40 is slidably inserted into the top portion of the handle joint 28. The display mount lock 34 is used to secure the display mount 40 in place. The exemplary slot lock 34 is a thumb screw and couples with the handle joint 28 by threaded insertion.

Figure 4:
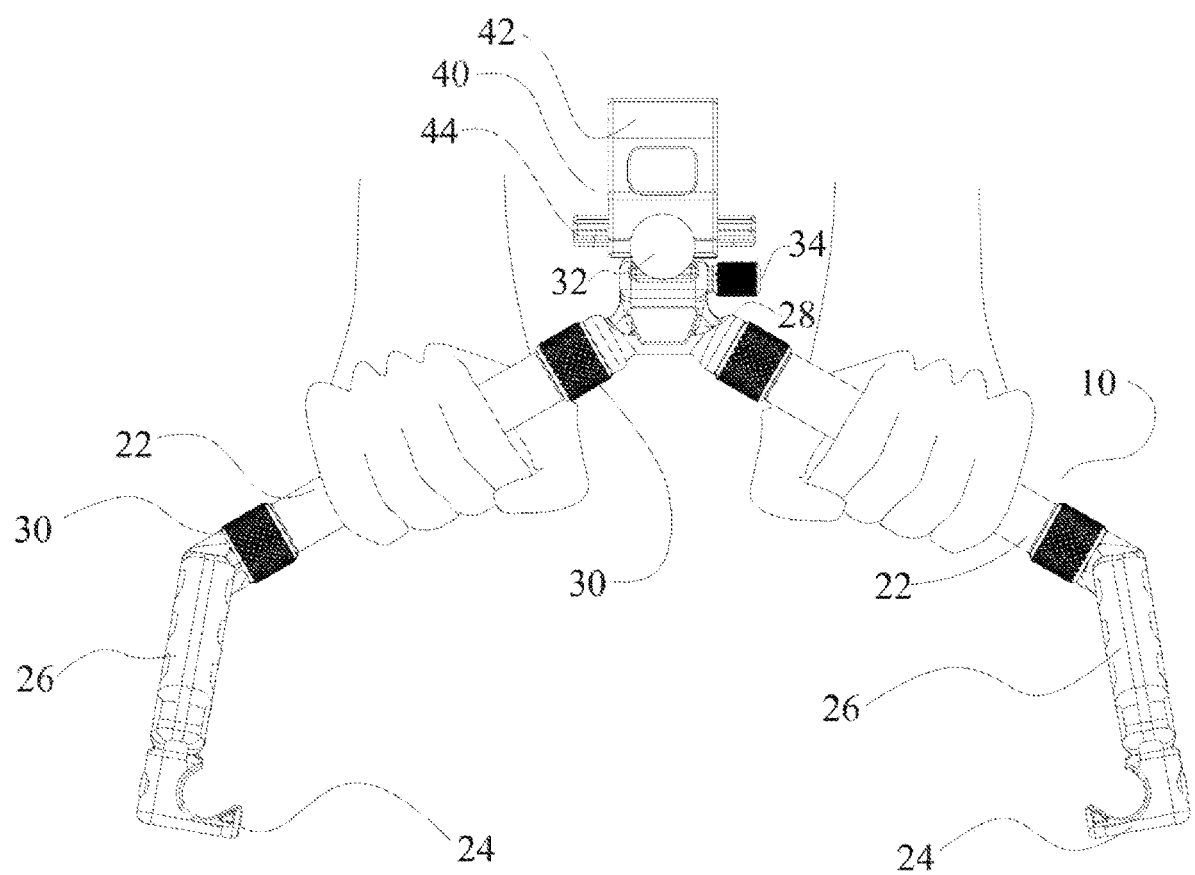
FIG. 4 is a schematic drawing of the drone stabilizing handles.

FIG. 4 shows the drone handles 10 in use. The photographer can grab the drone stabilizing handles 10 with one or both hands. The handles 22 and extension arms 26 are configured to create sufficient space between a mounted drone and grip arms 22 to allow either a pronated (as shown) or supinated grip. The drone handles facilitate easy motion for the desired pan, tilt, or roll desired in videography.

Figure 5:
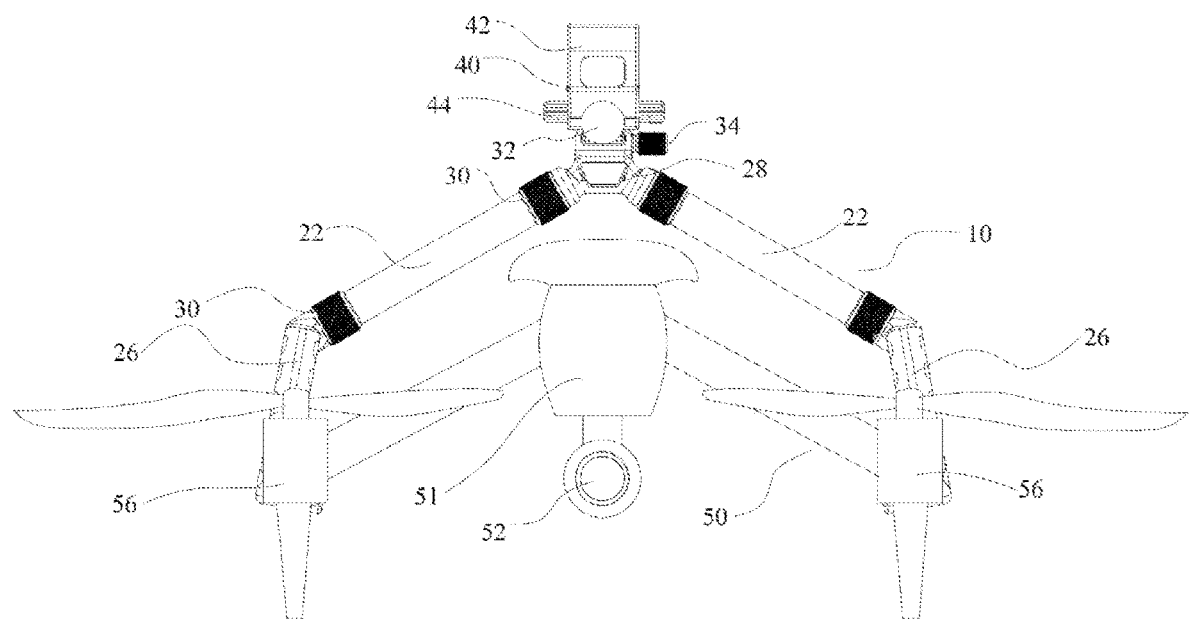
FIG. 5 is a front view of the drone stabilizing handles with a drone coupled.

FIG. 5 shows a drone 50 attached to the drone stabilizing handles 10. The exemplary handles 22 extend laterally relative to the drone body 51 and attach to the drone wings 56. Sufficient space between the handles 22 and drone wings 56 to allows a user to grip and manipulate the drone body 50. The handles 22 are positioned outside the optical spectrum of the drone camera 52.

An electronic display or remote controller, or a device performing both functions may be placed in the display mount 40. The device can be oriented to allow optimal control of control functions and easy viewing of the display. The display device or controller may be wirelessly connected with the drone 50 for transmission of image or other data. The proximity of the display mount 40 also permits hardwire connection with the coupled drone 50.

The display mount 40 is positioned above and between the handles 22 when in use. An electronic display can be mounted in this position for easy operation and viewing. The display mount 40 is aligned with the torso of the user, allowing easy viewing and access to a mounted device. The display mount 40 is obliquely oriented so the display or controller will be facing upwards towards the user, allows easy viewing of displayed image data and control ability.

The foregoing discussion discloses and describes exemplary embodiments and methods. As will be understood by those familiar with the art, the disclosed subject matter may be embodied in other specific forms without departing from the essence or characteristics thereof. Accordingly, the foregoing disclosure is intended to be illustrative, but not limiting, of the scope of the invention, which is set forth in the claims.

We claim:

1. An apparatus for manual operation of a drone, comprising:
   a. Two handles, each of said handles of sufficient size be held by a human hand,
   b. Said handles being attached and extending away from each other,
   c. The distal ends of said handles comprising coupling components capable of coupling a drone,
   d. A handle joint connecting the handles over the drone, said handle joint capable of coupling a display mount,
   e. Said display mount configured to receive a device.

2. The apparatus in claim 1, wherein the coupling components are coupling hooks configured to receive drone wings and use pressure fitting as means of coupling.

3. The apparatus in claim 1, wherein the coupling components are clamping mechanisms configured to surround said drone wings when engaged.

4. A device for carriage of a drone, comprising:
   a. A display mount configured to removably couple a electronic display,
   b. A handle joint with a coupling component capable of coupling the display mount,
   c. Said handle joint comprised of two components capable of coupling handles,
   d. Said handles being cylindrical and providing adequate surface area to be held by human hand, said handles extending away from the display mount when coupled,
   e. Coupling components capable of coupling a drone at the distal end of the handles.

5. The device in claim 4, wherein the display coupling component positioned above the handle joint.

6. The device in claim 4, wherein the handle coupling components permit threaded attachment of the handles.

7. An apparatus for manual operation of a drone camera, comprising:
   a. A plurality of handles,
   b. At least one of said handles comprised of at least one component capable of coupling a drone,
   c. An electronic display connected with at least one of the handles,
   d. Said electronic display capable of communicatively coupling with a drone camera and gimbal system.

8. The apparatus in claim 7, wherein the handles are comprised of polycarbonate material.

\* \* \* \* \*